United States Patent
Little

(10) Patent No.: US 7,499,610 B2
(45) Date of Patent: Mar. 3, 2009

(54) METHOD OF USING A POLARIZATION SORTER

(75) Inventor: Brent E. Little, Glen Head, NY (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 11/810,849

(22) Filed: Jun. 7, 2007

(65) Prior Publication Data
US 2008/0025665 A1   Jan. 31, 2008

Related U.S. Application Data

(62) Division of application No. 11/495,201, filed on Jul. 28, 2006, now Pat. No. 7,373,042.

(51) Int. Cl.
*G02B 6/28* (2006.01)

(52) U.S. Cl. .............. 385/28; 385/11; 385/29; 385/43

(58) Field of Classification Search ............. 385/27–30, 385/43, 50, 11
See application file for complete search history.

(56) References Cited

U.S. PATENT DOCUMENTS

| | | | |
|---|---|---|---|
| 4,772,084 A | 9/1988 | Bogert | |
| 5,056,883 A | 10/1991 | Diemeer et al. | |
| 5,111,517 A | 5/1992 | Riviere | |
| 5,133,029 A | 7/1992 | Baran et al. | |
| 5,151,957 A | 9/1992 | Riviere | |
| 5,293,436 A | 3/1994 | Diemeer | |
| 5,475,771 A | 12/1995 | Hosoi | |
| 5,696,856 A * | 12/1997 | Van Der Tol | 385/11 |
| 5,946,434 A | 8/1999 | Lee | |
| 7,035,491 B2 | 4/2006 | Little | |
| 7,072,532 B2 | 7/2006 | Watts | |
| 7,127,131 B2 * | 10/2006 | Watts | 385/11 |

OTHER PUBLICATIONS

Garner et al, "Vertically Integrated Waveguide Polarization Splitters Using Polymers", IEEE Photonics Letters, vol. 11, No. 7, Jul. 1999.*

* cited by examiner

*Primary Examiner*—Hemang Sanghavi
(74) *Attorney, Agent, or Firm*—Ross M. Carothers

(57) ABSTRACT

A method of using a passive polarization sorter comprising the step of deploying a first waveguide and a second waveguide forming an adiabatic region along a portion of their length. Then, an input optical signal is introduced into the first waveguide wherein light having at least one guided TE polarized mode of mode ranking mode-i-TE and at least one guided TM polarized mode of mode ranking mode-j-TM remaining within the first waveguide. Light having the other one of the TE and TM polarized modes is evanescently coupled into the second waveguide in the adiabatic region.

26 Claims, 11 Drawing Sheets

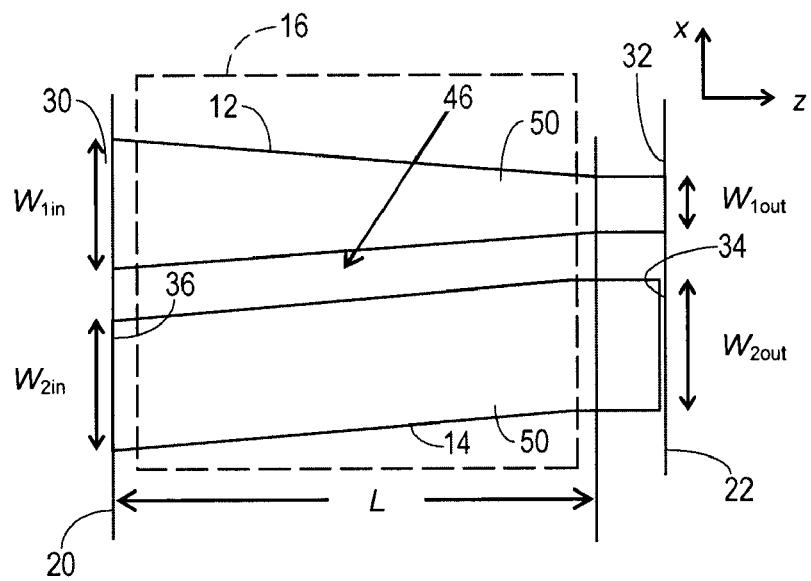
*Fig. 2a*
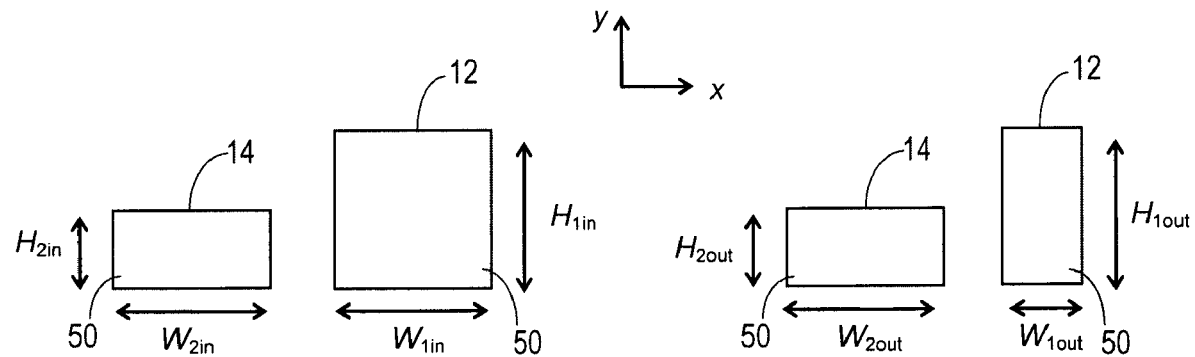
*Fig. 2b*  *Fig. 2c* input plane output plane

METHOD OF USING A POLARIZATION SORTER

CROSS REFERENCE TO RELATED APPLICATIONS

The present patent application claims priority under 35 U.S.C. §120 as a divisional patent application of U.S. Ser. No. 11/495,201 filed on Jul. 28, 2006 and entitled "Polarization Sorter" now U.S. Pat. No. 7,373,042, the entire content of which is hereby incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention relates generally to a method of separating two polarization states of an input optical signal, and more particularly, but not by way of limitation, a passive polarization sorter for separating the Transverse Electric (TE) polarization state and the Transverse Magnetic (TM) polarization state of the input optical signal into at least two geometrically separated outputs.

2. Brief Description of the Related Art

Light is a vector field that has two primary and orthogonal polarization states or vector directions. Generally, the polarization states are referred to as the S and P polarizations in free space optics, or the TE (Transverse Electric) and TM (Transverse Magnetic) modes of optical waveguides. The performance of optical waveguides and optical devices is often sensitive to the polarization state. That is, the response of the device changes as the polarization state changes. This is particularly pronounced in integrated optical waveguides that are fabricated on dielectric substrates.

Typically, it is desirable to have optical components that are insensitive to the input state of polarization. In fiber optic telecommunications, the polarization state of an optical signal that has traveled down any length of fiber is unknown, random, and time varying (due to perturbations in the environment). Great care is often taken in the design and fabrication of optical components so that they behave in a polarization insensitive manner. Despite this effort, many devices remain polarization sensitive to some degree, and this affects ultimate performance, yield, and cost.

There are some special applications where the two polarization states of an input optical signal needs to be spatially split so each can be manipulated independently, such as, for example, PMD (Polarization Mode Dispersion) compensators, where the dispersion of the signal on the two states needs to be equalized. In applications where the polarizations need to be split, the extinction ratio, which is the ratio of wanted to unwanted polarization in either of the two branches, must be high.

Generally, another way to handle polarization in a device that is required to behave as if it were polarization insensitive is to split the input polarization into two branches having orthogonal states, process each branch independently with devices that are optimized for each polarization respectively, and then recombine the processed signals together. This scheme is referred to as "polarization diversity". Each branch can be specifically optimized for its respective polarization, giving the best performance without otherwise having to compromise the ability to give adequate performance over two polarization states simultaneously.

Traditionally, optical components have been quite large, and polarization diversity schemes have not been popular because of the added size and cost associated with packaging twice the componentry plus the splitters. Prospects for polarization diversity improve for integrated optics fabricated on substrates, where the objective is to shrink the size of components and to integrate various functionalities on a common die or chip, similar in concept to integrated electronic circuits (ICs). Polarization splitters and two sets of components are fabricated all at once. Future integrated optical components are miniaturized by the use of high-index contrast waveguides. High-index waveguides themselves are more susceptible to polarization sensitivity. Polarization diversity may be the only path forward for these future high-index contrast components.

Polarization sorters, also called polarization beam splitters or simply polarization splitters, are important building block elements in integrated optics and planar lightwave circuits. In polarization diverse optical circuits where the polarization states of an input optical signal are separated and processed independently, polarization sorters are essential.

A polarization sorter separates the two orthogonal polarization states of an input optical signal into two geometrically separated outputs. The arbitrary input signal is composed of two principle states of polarization. In planar lightwave circuits and integrated optics, these states are commonly referred to as the TE polarization state, and the TM polarization state. The TE state is characterized as that state where the electric field is predominantly polarized parallel to the optical circuit substrate, while the TM state is characterized as that state where the magnetic field is predominantly polarized parallel to the optical circuit substrate (Dietrich Marcuse, "Theory of dielectric optical waveguides", New York, Academic 1974). For an arbitrary input signal, the relative amounts of power in the TE and TM states are both arbitrary and can also be time-varying.

Therefore, there is a need for an effective and efficient waveguide structure for separating the polarization of an optical signal.

BRIEF DESCRIPTION OF SEVERAL VIEWS OF THE DRAWINGS

FIG. 2a is a top view of first and second waveguides of the polarization sorter of FIG. 1.

FIG. 2b is a side-elevational view of inputs of the first and second waveguides depicted in FIG. 2a.

FIG. 2c is a side elevational view of outputs of the first and second waveguides depicted in FIG. 2a.

FIG. 4a shows the field profiles for the highest ranking TE mode at the input plane of the two-waveguide polarization sorter.

FIG. 4b shows the field profiles for the highest ranking TE mode at the output plane of the two-waveguide polarization sorter.

FIG. 4c shows the field profiles for the highest ranking TM mode at the input plane of the two-waveguide polarization sorter.

FIG. 4d shows the field profiles for the highest ranking TM mode at the output plane of the two-waveguide polarization sorter.

FIG. 5a shows a simulation of the TM field along an example polarization sorter from the input plane to the output plane.

FIG. 5b shows a simulation of the TE fields along an example polarization sorter from the input plane to the output plane.

FIG. 10a is a top plan view of another version of a polarization sorter constructed in accordance with the present invention.

FIG. 10b is a cross-sectional view taken along the lines 10b-10b depicted in FIG. 10a.

FIG. 10c is a cross-sectional view taken along the lines 10c-10c depicted in FIG. 10a.

FIG. 10d is a cross-sectional view taken along the lines 10d-10d depicted in FIG. 10a.

DETAILED DESCRIPTION OF THE INVENTION

Figure 1:
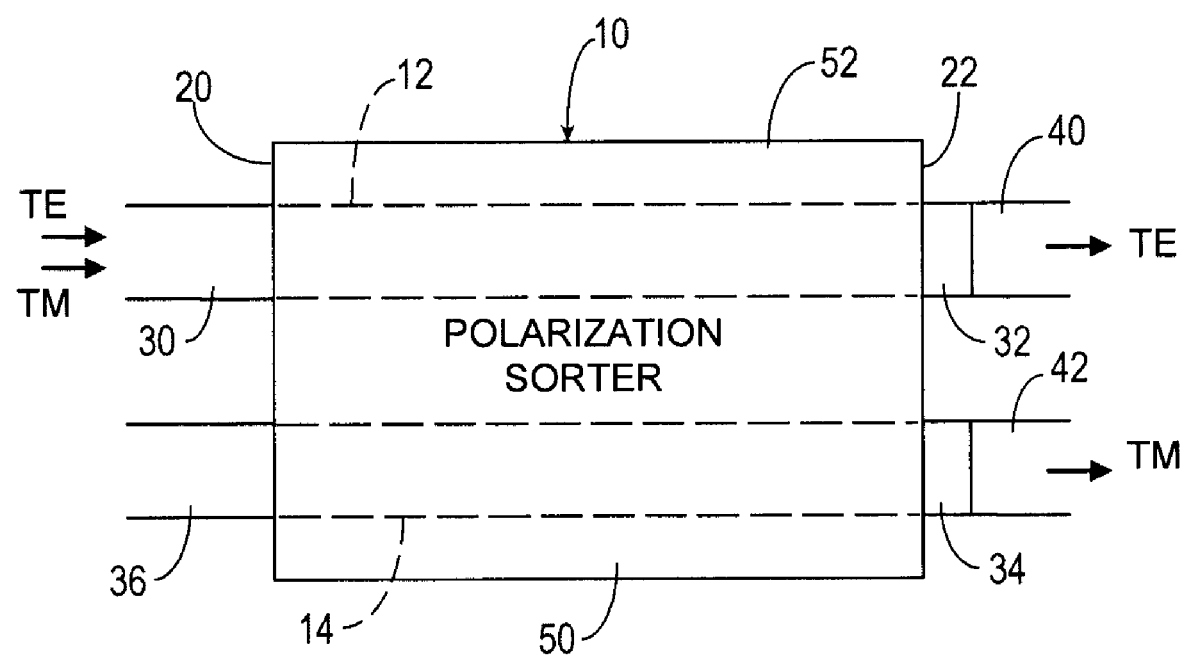
FIG. 1 is a top view of one embodiment of a polarization sorter constructed in accordance with the present invention.

Referring now to the drawings, and in particular to FIGS. 1, 2a-2c, and 3 shown therein is an exemplary polarization sorter 10 constructed in accordance with the present invention. In general, the polarization sorter 10 includes at least two evanescently coupled waveguides, which will be referred to hereinafter as a first waveguide 12 and a second waveguide 14. The first waveguide 12 supports at least one guided TE polarized mode of mode ranking mode-i-TE, and at least one guided TM polarized mode of mode ranking mode-j-TM. The second waveguide 14 supports at least one of a guided TE polarized mode of mode ranking mode-i-TE, and a guided TM polarized mode of mode ranking mode-j-TM.

The first and second waveguides cooperate to form an adiabatic region 16 (shown by way of dashed lines in FIG. 2a) in which light having one of the TE and TM polarized modes remains within the first waveguide 12, and light having the other one of the TE and TM polarized modes evanescently couples into the second waveguide 14. In general, a light wave (or light signal) is incident upon or enters the polarization sorter 10 via the first waveguide 12 and propagates through the adiabatic region 16 of the polarization sorter 10 where the light wave exits the polarization sorter 10. As the light wave propagates through the adiabatic region 16 of the polarization sorter 10, the states of polarization are separated.

In a preferred embodiment, the polarization sorter 10 is implemented as a rectangular optical chip. For this reason, the various embodiments will be described herein as having an "input plane" 20 and an "output plane" 22. However, it should be understood that the polarization sorter 10 can be implemented with other shapes and configurations, and thus the input and output planes 20 and 22 do not have to be flat or level surfaces or opposing surfaces of an optical chip.

In the embodiment depicted in FIGS. 2a-2c, the first waveguide 12 and the second waveguide 14 are disposed between the input plane 20 and the output plane 22. The first waveguide 12 has an input 30 and an output 32. The input 30 is aligned with the input plane 20, and the output 32 is aligned with the output plane 22. The second waveguide 14 has an output 34 aligned with the output plane 22, and an input 36 that can be optionally aligned with the input plane 20. It should be understood that the inputs 30 and 36 can either extend past, or not extend to the input plane 20. Likewise, the outputs 32 and 34 can either extend past or not extend to the output plane 22.

The input 30 of the first waveguide 12 is configured to receive light having both the TE and TM polarized modes, and the output 32 of the first waveguide 12 is configured to provide light of one of the TE and TM polarized modes. The output 34 of the second waveguide 14 is configured to provide light of the other one of the TE and TM polarized modes. Output waveguides 40 and 42 can be coupled to the outputs 32 and 34.

Thus, the polarization sorter 10 separates a state of polarization of a light signal. More particularly, the polarization sorter 10 uses the principle of mode evolution which receives a light signal having an arbitrary (or predetermined) state of polarization in the first waveguide 12, separates at least two modes, such as TE and TM components of the light signal, and typically directs the at least two modes into two separate output waveguides 40 and 42. By making gradual or adiabatic changes to the geometry or refractive index of the first waveguide 12, or second waveguide 14, or both, the modes in the first waveguide 12 can be conditioned and the polarization states separated.

The polarization sorter 10 works on an Adiabatic Sorting Principle. The Adiabatic Sorting Principle holds that mode ranking and polarization are preserved in an arbitrary system of coupled waveguides, even if the physical geometries or refractive index of those waveguides change along their lengths, so long as the change is slow enough so as to not cause inter-modal coupling or loss. The condition of no coupling and no loss is called the adiabatic criteria. Such an approach only requires that the modes not exchange power that is assured by proper design of the first and second waveguides 12 and 14 and a slow evolution of the structure. Since prevention of mode coupling is a relatively loose requirement, devices based on mode evolution tend to be wavelength insensitive and fabrication tolerant. The resulting polarization sorter 10 is fabrication and wavelength insensitive. It is also preferably a completely passive component, requiring no thermo-optic or electro-optic tuning to optimize its performance. Preferably, the polarization sorter 10 is used in a planar lightwave circuit configuration.

While the polarization sorter 10 is generally described herein in terms of the light wave entering via the input 30 of the first waveguide 12 and exiting via the outputs 32 and 34 for purposes of clarity of discussion, it should be understood that the present invention also contemplates that alternatively, two separate light waves can enter the polarization sorter 10 via the outputs 32 and 34 of the first and second waveguides 12 and 14 and exit via the input 30 of the first waveguide 12. When operated in reverse, the polarization sorter 10 is often referred to as a polarization beam combiner, or simply polarization combiner. Further, input 36 may also be used to accept the input light.

In a preferred embodiment, the light wave has both TE and TM polarization components, respectively. The TE and TM components are separated in the polarization sorter 10 and appear at the two distinct outputs 32 and 34, respectively. Preferably, only TE polarized signals exit one output 32, while only TM polarized signals exit the output 34. There can be unwanted leakage of the TM component out the TE output 32, and likewise leakage of the TE component out the TM output 34. The ratio of the leakage TM power to the TE power in the TE output 32, (when both components are normalized to carry the same amount of power at the input), is called the polarization extinction ratio (or simply "extinction ratio" here) at the output 32 (e.g., TE port). Likewise, the polarization extinction ratio (or simply "extinction ratio") at the output 34 (e.g., TM port) is defined as the ratio of the leakage TE power to the TM power at the output 34 (e.g., TM port). It is desirable to make this ratio as large as possible, since the unwanted leakage power can lead to overall degradation of the transmission system in which this component is embedded.

The first and second waveguides 12 and 14 are separated by a gap 46. The gap 46 is small enough to allow the optical modes of the first and second waveguides 12 and 14 to evanescently interact. The width of the gap 46 can be uniform or non-uniform so long as the first and second waveguides 12 and 14 are evanescently coupled. Further, the gap 46 can be eliminated by constructing the first and second waveguides 12 and 14 of materials having different refractive indices. The gap might also be eliminated if the first and second waveguides have different heights.

The total length of the polarization sorter 10 is defined as "L". Each of the first and second waveguides 12 and 14 has a width "W" and height "H", at the input plane 20 and the output plane 22. The geometry of the first and second waveguides 12 and 14, e.g., heights, widths, and gap 46, may all vary along the length of the polarization sorter (the lengthwise direction is along the z-axis as shown).

Each of the first and second waveguides 12 and 14 has a core 50 disposed within a cladding 52. The core 50 is constructed of a high refractive index material where most of the optical light that enters the polarization sorter 10 is confined. The high refractive index material may be silicon, silicon nitride, silicon carbide, silicon oxynitride, silicon oxycarbide, silicon oxynitride-carbide, germanium-doped silica, indium phosphide alloys, gallium arsenide alloys, polymers, and combinations thereof. The cladding 52 is constructed from a lower index material such as silica, lower index silicon oxynitride, lower index silicon oxycarbide, lower index silicon oxynitride-carbide, lower index doped silica including germanium and or phosphorus doped silica, lower index polymers, and lower index alloys of indium phosphide or gallium arsenide, and combinations thereof. The refractive indexes may vary along the length of the polarization sorter 10 (in the z-direction). The core 50 of each of the first waveguide 12 and the second waveguide 14 can have different refractive indexes, but typically the cores 50 are similar for ease of manufacture. Waveguides support so called characteristic modes, or simply "modes" (see, for example, Dietrich Marcuse, "Theory of dielectric optical waveguides", New York, Academic 1974). Modes are Electric and Magnetic field profiles for each polarization propagated along a waveguide. A mode or set of modes always carries optical power in a waveguide. Each mode has associated with it a characteristic "effective mode index", or simply "effective index". The effective index of a particular mode on a particular waveguide can be calculated by a variety of methods, including numerical methods. Commercial computer aided design packages are commonly available (see, for example, Apollo Photonics Inc, Hamilton, Ontario Canada www.apollophoton.com, or C2V Inc., Enschede, the Netherlands, www.c2v.nl) for calculating modes and their propagation through complicated optical circuits.

By way of example, specific dimensions for the first and second waveguides will be discussed below, however, it should be understood that the first and second waveguides 12 and 14 can be constructed with different dimensions. Referring to FIGS. 2a-2c, the first waveguide 12 has a height of 1.5 µm everywhere (that is, $H_{1in}=H_{1out}=1.5$ µm), while the second waveguide 14 has a height of 0.75 µm everywhere (that is, $H_{2in}=H_{2out}=0.75$ µm). At the input plane 20, the first waveguide 12 is square with a width equal to its height $W_{1in}=H_{1in}=1.5$ µm. At the input plane 20, the second waveguide 14 is rectangular with a width $W_{2in}=1.5$ µm greater than its height $H_{2in}=0.75$ µm. The first and second waveguides 12 and 14 have a uniform refractive index of 1.70 and have a uniform cladding of refractive index 1.45 surrounding the first and second waveguides 12 and 14. At the output plane 22, the first waveguide 12 has a width of $W_{1out}=0.75$ µm, and the second waveguide 14 has a width of $W_{2out}=1.5$ µm. That is, the first waveguide 12 has a width that tapers in, while the second waveguide 14 has a width that remains constant.

The polarization sorter 10 is formed on the adiabatic sorting principle. The adiabatic sorting principle holds that mode number and polarization are always preserved in a waveguide or a system of evanescently coupled waveguides even when parameters of any waveguide such as width, height or index, vary slowly along the length of the system of waveguides. The effect of adiabatic following is that if a first mode is launched at the input of the system of adiabatically varying waveguides, then at the final output, the signal will still reside in the first mode, whatever the first mode happens to look like at the output. Similar rules hold for launching any other mode. The input waveguides and their mode profiles can look significantly different from the output waveguides and their mode profiles, however, so long as the transformation is "slow" between input and output, then the adiabatic following principle holds. Quantitatively, "slow" or adiabatic means that power is not coupled or scattered from one mode to another, and in practice, the transformation can always be made adiabatic if the device is made long enough, and discontinuities are avoided. Mode number is defined as a ranking of the effective indexes of all the modes of a particular polarization for the complete system of coupled waveguides. The mode with the largest effective index for the TE polarization is labeled "mode-1-TE". The mode with the second largest effective index of the TE polarization is labeled "mode-2-TE", and so on. The modes are ranked by their effective indexes such that mode-1-TE>mode-2-TE>mode-3-TE, etc., and similarly for the TM polarizations. Mode order ranking includes both guided and radiation modes.

Using the adiabatic sorting principle, a waveguiding structure is designed so that at the input plane 20 the TE and TM states are input in the first waveguide 12, in mode numbers mode-i-TE and mode-j-TM, while the first and second waveguides 12 and 14 have a geometry or refractive index so that mode-j-TM and mode-i-TE are in two separate waveguides at the output, i.e., the first and second waveguide 12 and 14. Along the polarization sorter from input to output, the waveguides 12 and 14 are slowly varied in order to transform the input structure to the output structure in an adiabatic fashion. The adiabatic sorting causes the modes to evolve into separate waveguides.

Figure 3:
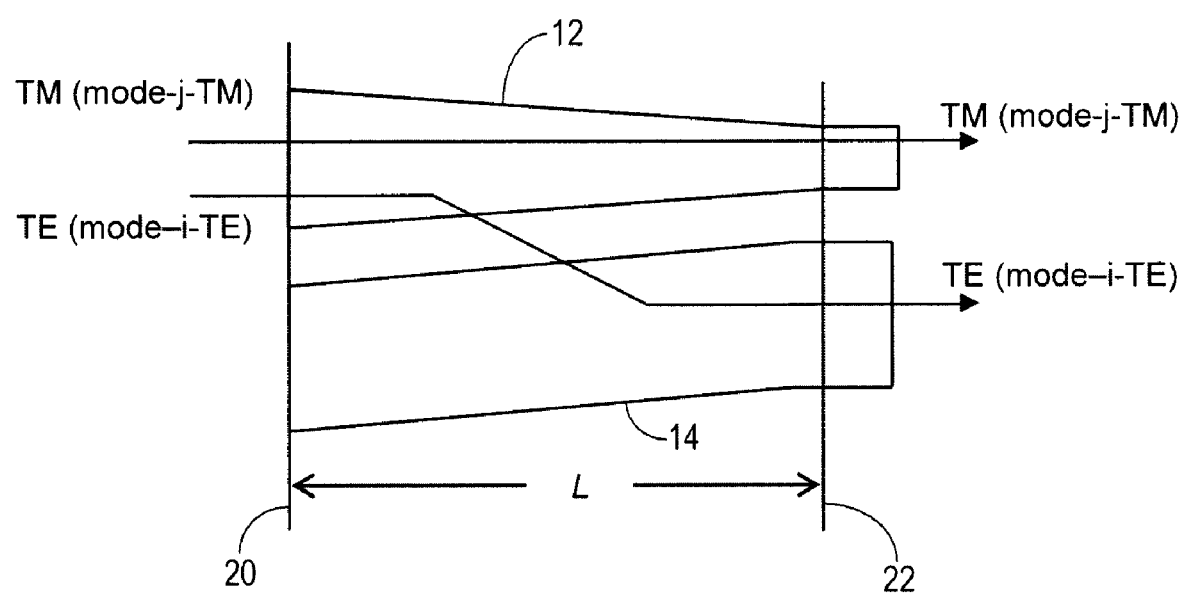
FIG. 3 shows a path of the polarization evolutions for the Transverse Electric (TE) and Transverse Magnetic (TM) polarization states.
Figure 4A:
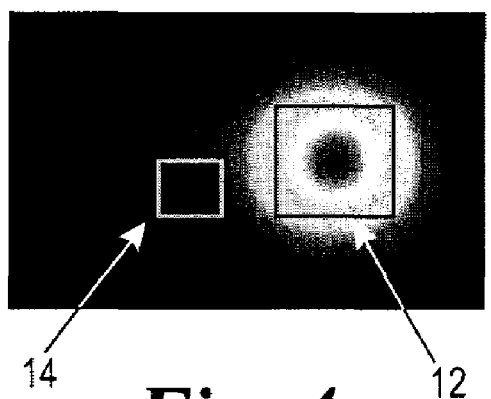
FIGS. 4a-4d show the field profiles for the highest ranking TE and TM modes at the input plane and output plane of the two-wave-guide polarization sorter.
Figure 4B:
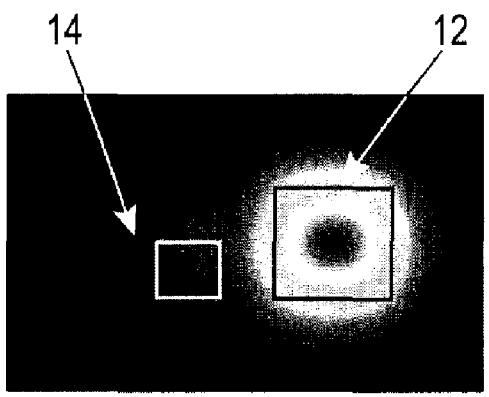
Figure 4C:
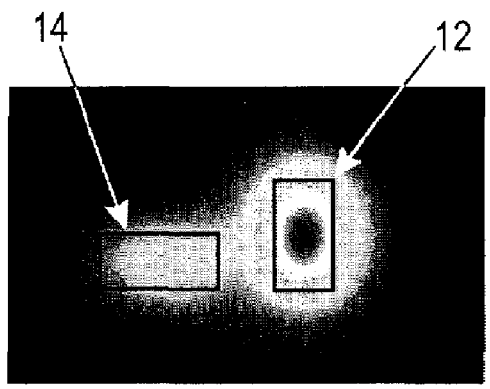
Figure 4D:
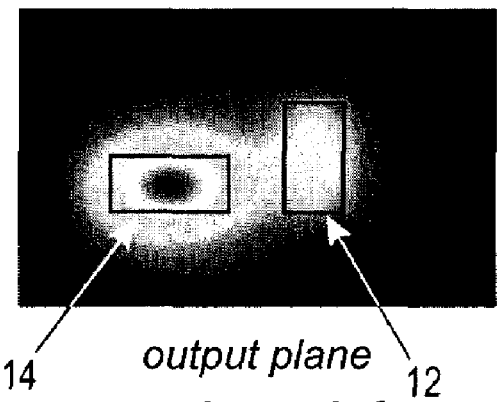

For example, shown in FIG. 3 is the adiabatic sorting action in the polarization sorter 10 of FIGS. 2a-2c. The optical signal is input into the first waveguide 12. The first waveguide 12 or both the first and second waveguides 12 and 14 are slowly transformed from the input plane 20 to the output plane 22. Mode-j-TM remains associated with the first waveguide 12 (input waveguide), while mode-i-TE transforms from the first waveguide 12 to the second waveguide 14. As the first and second waveguides 12 and 14 are slowly transformed from the input plane 20 to the output plane 22, the mode ranking of mode-i-TE shifts from being associated with the first waveguide 12 to being associated with the second waveguide 14 at some intermediate point. At the intermediate point, the TE mode "follows" the mode ranking into the second waveguide 14. Polarization states on a common input have thus been separated, or sorted, into two waveguides 12 and 14.

In general, the adiabatic sorting principle does not depend on the details of the exact waveguide structure within a certain design window, or how that structure varies along the polarization sorter 10. This is important because it implies that the polarization sorter 10 can be fabrication insensitive and wavelength insensitive, attributes which are important for many optical waveguide circuits. The adiabatic principle holds if the structure is made long enough, and abrupt discontinuities are avoided. The term "abrupt" as used herein means a change in structure such that the mode field profiles on either side of the discontinuity are different enough so as to cause scattering.

The polarization sorter 10 can be manufactured using various techniques such as conventional planar lightwave circuit (PLC) fabrication techniques. Conventional PLC fabrication techniques leverage the installed base of batch tools used for integrated electronic circuits (so called "ICs") in order to produce well-controlled circuits in scalable volumes. Such techniques usually involve thin film deposition and etching steps. Dielectric material is deposited or grown on substrates, and then optical circuits are subsequently patterned and etched into those dielectrics. (See, for example, "Integrated Optics, Theory and Technology", by Robert G. Hunsperger, Spring 4$^{th}$ Edition 1995, or "Optical Integrated Circuit", by Hiroshi Nishihar, Masamitsu Haruna, Toshiaki Suhara, McGraw-Hill 1989.)

The effective mode indexes of the coupled first and second waveguides 12 and 14 are manipulated in such a way so as to cause polarization sorting. The effective index of the waveguides 12 and 14 is a function of the refractive index of the waveguide's core 50 and cladding 52, as well as the waveguide's height and width (or more generally, its geometry if the guide is not rectangular). In conventional PLC fabrication technologies, especially those that utilize IC fabrication tools, the refractive index of a planar layer is uniform, and it is difficult to vary it along the length of an optical circuit. Varying the width of the waveguides 12 and/or 14 is accomplished in the design of a photomask that is used to "print" the circuit. The photomask (or photo-reticle as it is sometimes called) delineates all of the waveguide boundaries and is one of the more popular methods of defining the optical circuit pattern. The waveguide's (12 and/or 14) height can be changed, at least stepwise, by etching away part of the waveguide's original thickness in prescribed regions of the optical circuit. In general, the effective index of any mode supported by a waveguide increases when either the height or the width of a waveguide increases. Further, changing the height or width of a waveguide will affect the TE and TM polarizations unequally.

Referring to FIGS. 4a-4d, TM and TE field profiles for the highest ranking TM and TE modes of the polarization sorter 10 are shown. Each of the first and second waveguides 12 and 14 supports a TE polarized mode and a TM polarized mode. Thus, there are a total of four guided modes. A numerical mode solver (for example, Apollo Photonics Inc. of Hamilton, Ontario Canada, www.apollophoton.com) is used to find the effective indexes of all modes, and thus the ranking of the modes. The highest-ranking modes of each polarization at the input plane 20 and the output plane 22 for the compound two-guide structure are shown. At the input plane 20, the highest-ranking TE polarized mode (FIG. 4a) and TM polarized mode (FIG. 4b) are both in the first waveguide 12. At the output plane, the highest-ranking TE polarized mode (FIG. 4c) is on the second waveguide 14, while the highest-ranking TM mode (FIG. 4d) remains on the first waveguide 12. The TM mode entering into the first waveguide 12 at the input plane 20 remains in the first waveguide 12, while a TE mode entering into the first waveguide 12 at the input plane 20 would transfer over to the second waveguide 14. The length of the adiabatic region 16 can vary, but in a preferred embodiment is L=750 µm. The simulation was accomplished by Beam Propagation Method (BPM) which is available as a commercial package (for example, C2V Inc., Enschede, the Netherlands, www.c2v.nl).

Figure 5A:
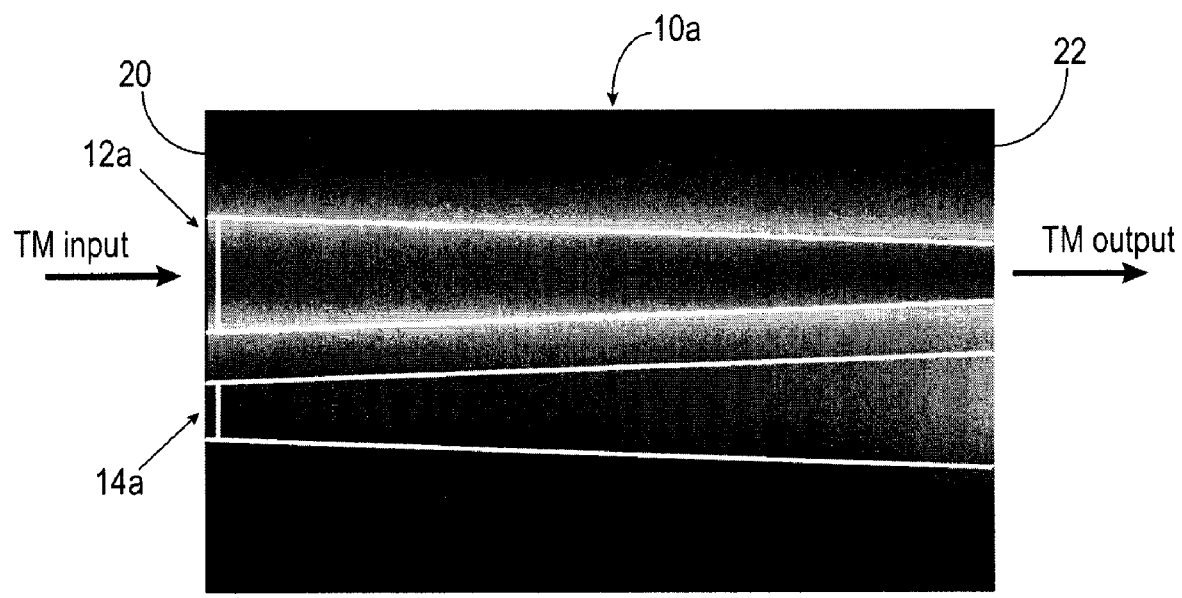
FIGS. 5a-5b show a simulation of the TM and TE fields along an example polarization sorter from the input plane to the output plane.
Figure 5B:
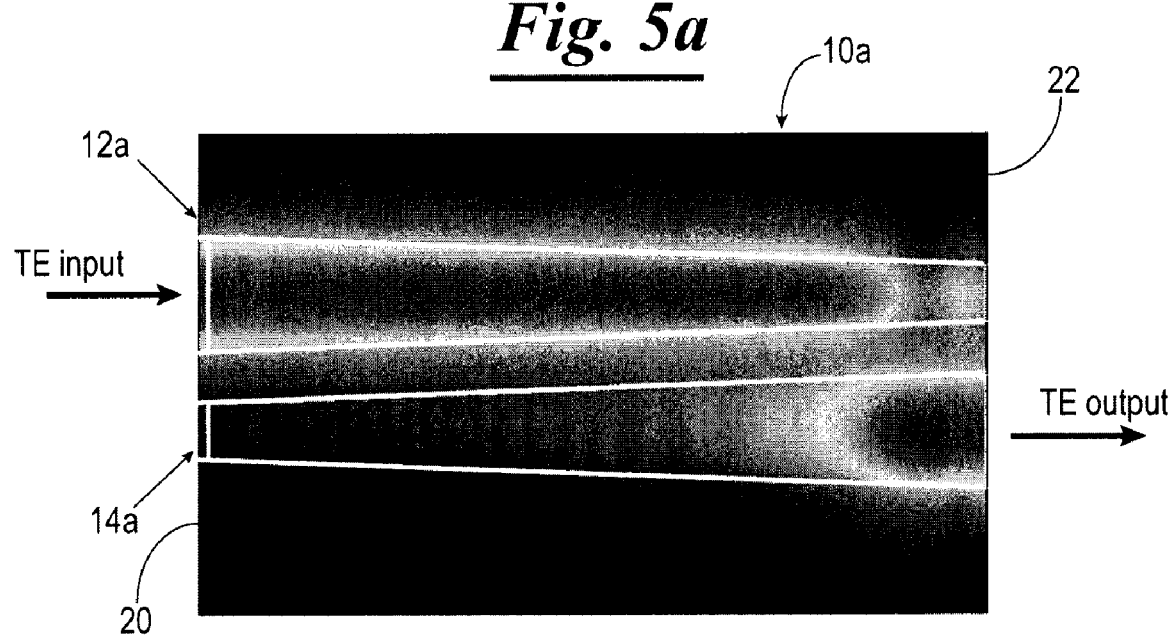

Referring to FIGS. 5a and 5b, shown therein is another embodiment of a polarization sorter 10a constructed in accordance with the present invention. The polarization sorter 10a includes a first waveguide 12a and a second waveguide 14a. The polarization sorter 10a is similar in construction and function as the polarization sorter 10 discussed above, with the exception that the second waveguide 14a tapers from the input plane 20 to the output plane 22.

In FIGS. 5a and 5b, the evolution of the TM mode and the TE mode field intensities are shown as grey scale plots. The TE mode crosses over from the first waveguide 12a to the second waveguide 14a as the width of the first waveguide 12a is reduced, while the TM mode stays in the first waveguide 12. At the output the two polarization states are substantially in two different waveguides 12a and 14a. The first and second waveguides 12a and 14a do not need to be separated and are not separated in this example for substantial polarization sorting action to occur.

As shown in FIGS. 5a and 5b, a simulation of the TM and TE fields along the polarization sorter 10a from the input plane 20 to the output plane 22 is shown. The input optical signal enters the polarization sorter 10a on the first waveguide 12a. The TM mode remains on the first waveguide 12a and the TE mode transfers over from the first waveguide 12a to the second waveguide 14a. It should be understood that the input signal may also be positioned on the second waveguide 14a. Thus, the input signal polarizations do not need to be associated with any preferred "vertically" or "horizontally" oriented input guide.

Figure 6:
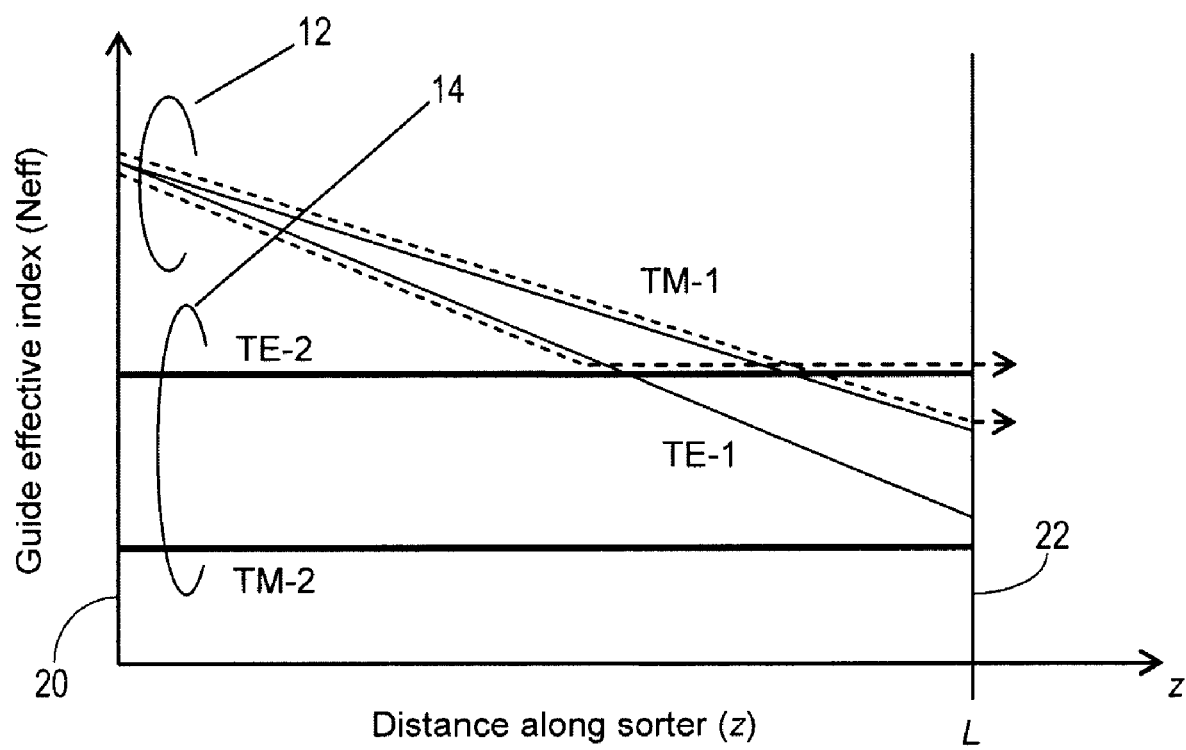
FIG. 6 shows the evolution of the effective mode indexes of the TE and TM modes in each waveguide as a function of distance along an example polarization sorter, when the input is on the first waveguide.

Referring to FIG. 6, a graphical representation of the effective mode indexes for modes as a function of distance along the polarization sorter 10 of FIGS. 2a-2c is shown. That is, $H_{1in}=H_{1out}=1.5$ µm, $H_{2in}=H_{2out}=0.75$ µm, $W_{1in}=1.5$ µm, and $W_{1out}=0.75$ µm. As shown in FIG. 2a-2c, the width of the second waveguide 14 is not tapered, but remains constant from input to output, $W_{2in}=W_{2out}=1.5$ µm. The TE and TM modes in the first waveguide 12 are labeled as TE-1 and TM-1, and the TE and TM modes in the second waveguide 14 are labeled as TE-2 and TM-2. The dimensions of the second waveguide 14 do not change in this example, thus, the effective indexes of the second waveguide 14, TE-2 and TM-2, remain constant along the polarization sorter 10. At the input plane 20, the first waveguide 12 is square, and thus the TE and TM polarized modes start out identical. Because the dimensions of the first waveguide 12 at the input plane are larger than those of the second waveguide 14, the effective indexes of TE-1 and TM-1 are larger than TE-2 and TM-2, respectively, of the second waveguide 20. Mode-1-TE=TE-1, mode-2-TE=TE-2, mode-1-TM=TM-1, and mode-2-TM=TM-2. As the width of the first waveguide 12 is tapered down, the effective indexes of both TE-1 and TM-1 decrease. Changing the width has a more pronounced effect on the TE mode, and TE-1 decreases faster than TM-1. As shown in the output plane 22, the TM mode of the first waveguide 12 remains larger than the TM mode of the second waveguide 14, while the TE mode of the first waveguide 12 is now smaller than the TE mode of the second waveguide. At some point along the tapered first waveguide 12 of the polarization sorter 10, the rankings of TE-1 and TE-2 are exchanged. At the input, TE-1 has the higher ranking, but as the width of the first waveguide 12 is tapered down, its effective index drops below that of the second waveguide 14. In the mode ranking nomenclature, mode-1-TE =TE-1 at the input plane 20, but at the output plane 22 mode-1-TE=TE-2. Then, power launched in the TE-1 mode at the input plane 20 will appear in the TE-2 mode at the output plane 22. On the other hand, throughout the device mode-1-TM is always TM-1. Power launched on TM-1 remains in the first waveguide 12.

The dashed lines in FIG. 6 show the path of the highest-ranking TE and TM modes in the polarization sorter 10. If the input signal is launched in the first waveguide 12 at the input plane 20, the signal will follow those dashed lines if the structure changes adiabatically. In curves such as FIG. 6, when the lines for two like polarizations cross, power is coupled from the first waveguide 12 to the second waveguide 14. This power coupling is complete (i.e., close to 100%) when the structure is adiabatic.

Figure 7:
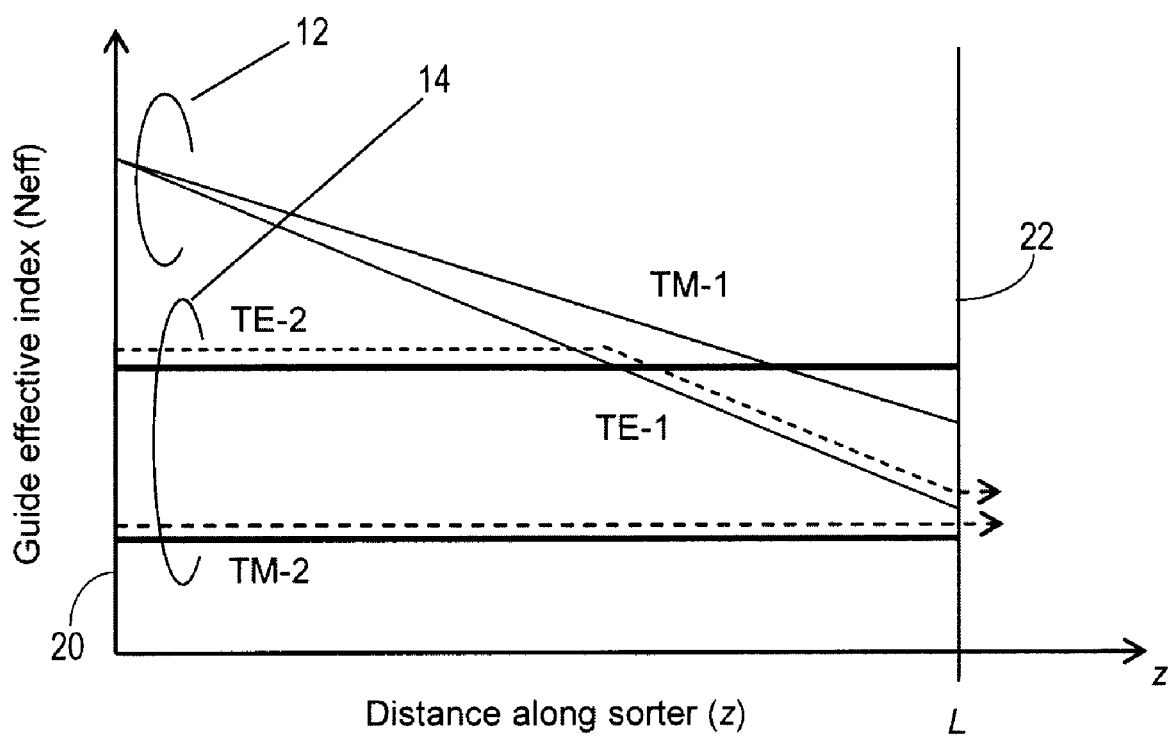
FIG. 7 shows the evolution of the effective mode indexes of the TE and TM modes in each waveguide as a function of distance along an example polarization sorter when the input is on the second waveguide.

Referring to FIG. 7, a graphical representation of the effective mode indexes of the TE and TM modes in the first and second waveguides 12 and 14 as a function of distance along the polarization sorter 10 is shown when an input is on the second waveguide 14. The modes are launched in the TE-2 and TM-2 modes, which both have smaller effective indexes than their counterparts in the first waveguide 12 (i.e., smaller than TE-1 and TM-1, respectively). The TM mode stays in the second waveguide 14, while the TE mode shifts from the second waveguide 14 to the first waveguide 12 when the effective index of TE-1 becomes smaller than TE-2. The dashed lines in FIG. 7 depict mode evolution.

Figure 8:
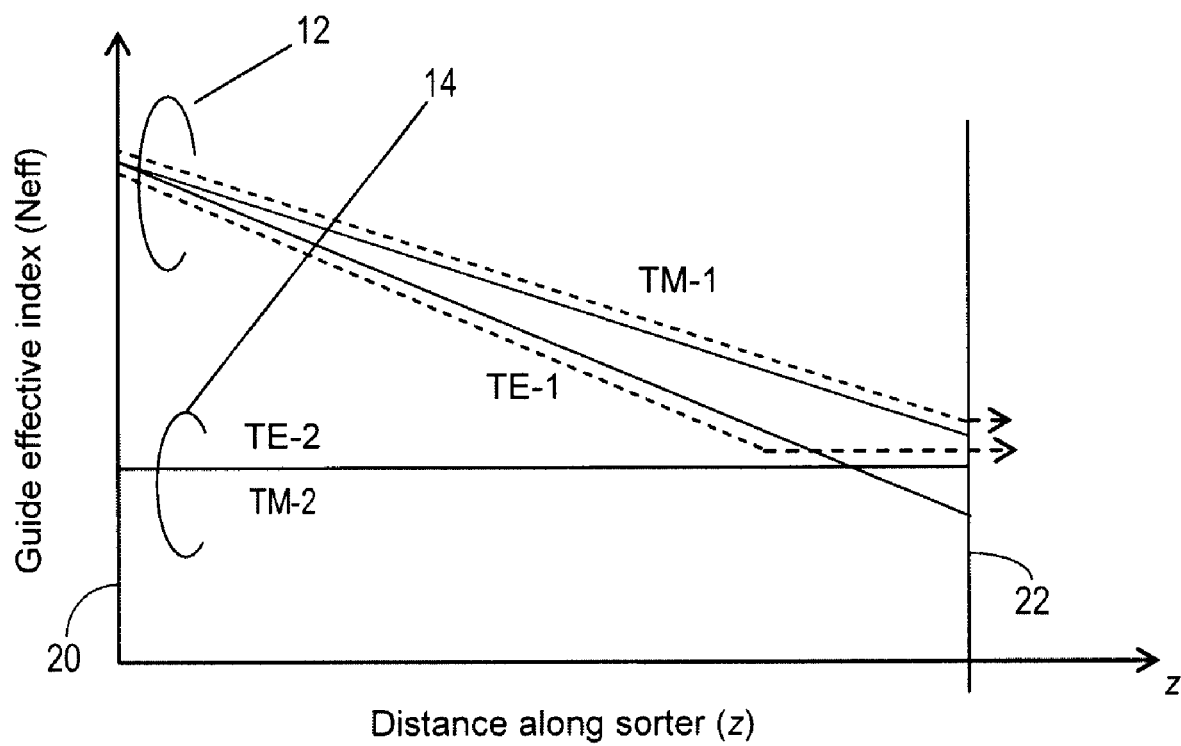
FIG. 8 shows the evolution of the effective mode indexes of the TE and TM modes in each waveguide as a function of distance along an example polarization sorter, where the second waveguide has a square geometry along the entire length.

Referring to FIG. 8, a graphical representation is shown of the effective indexes of the TE and TM modes in the first and second waveguides 12 and 14 as a function of distance along the polarization sorter 10 where the second waveguide 14 has a square geometry from the input plane 20 to the output plane 22 of the polarization sorter 10. The TE and TM modes of the square second waveguide 14 are identical if there is no material birefringence, and this is indicated in FIG. 8 by the same line for TE-2 and TM-2. The output geometry of the first waveguide 12 is chosen such that TM-1>TM-2, and TE-2>TE-1. This example is meant to show that at both the input plane 20 and the output plane 22, at least one waveguide 12 or 14 does not need to have any preferred "horizontal" or "vertical" orientation.

In the foregoing example of the polarization sorter 10 having two waveguides (i.e., the first and second waveguides 12 and 14), the waveguide geometries were constructed in such a way that at the input plane 20 the highest ranking TE and TM modes are in one waveguide 12), but at the output plane 22 the highest ranking TE and TM modes are in different waveguides, e.g., TE in guide 14, TM in guide 12 (see, for example, FIG. 4). Preferably, the TE and TM modes of the first waveguide 12 at the input plane 20 can always be made to have the highest ranking by making the dimensions of the first waveguide 12 sufficiently large. However, there may be a certain limited range of waveguide geometries at the output plane 22 that satisfies the criteria that the highest TE and TM modes are in different waveguides 12 and 14.

Figure 9:
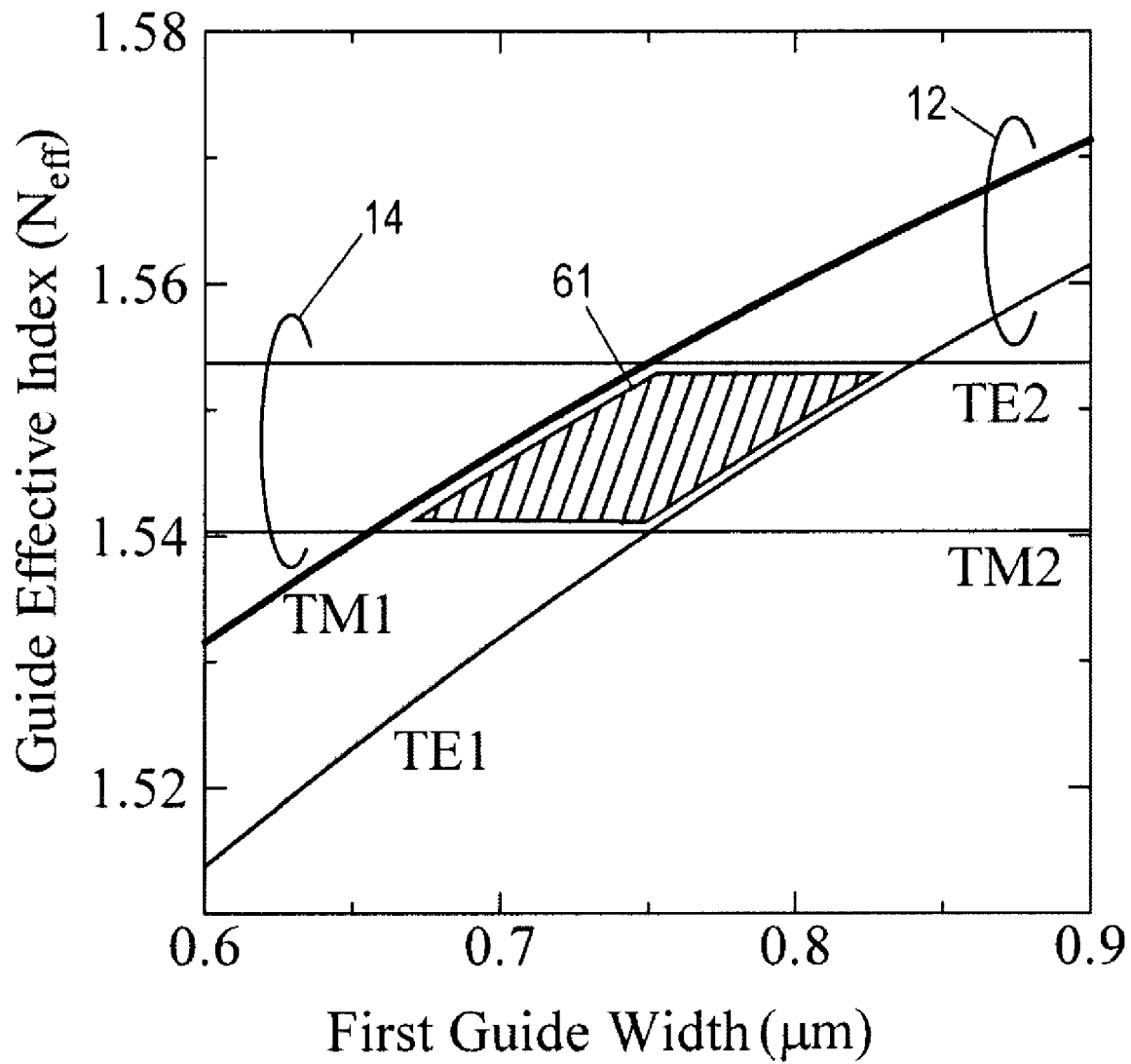
FIG. 9 depicts the range of output guide widths for the first waveguide in an example polarization sorter for which polarization sorting will occur.

Referring to FIG. 9, an example is shown of the range of widths for the first waveguide 12 at an output over which polarization sorting occurs. The first and second waveguides 12 and 14 have a core refractive index of 1.70, surrounded by the cladding 52 having a refractive index of 1.45. The second waveguide 14 has a width of $W_{2out}$=1.5 μm, and a height of $H_{2out}$=0.75 μm. The first waveguide 12 has a height of $H_{1out}$=1.5 μm, and a width that is varied in this plot. FIG. 9 shows the effective indexes of the modes in the second waveguide 14 (labeled TE-2 and TM-2), and the modes in the first waveguide 12 (labeled TE-1 and TM-1), as a function of the width of the first waveguide 12 The width of the first waveguide 12 does not have any impact on the modes of the second waveguide 14 as shown. Polarization sorting will occur for the conditions on the effective indexes such that TM-1>TM-2, and TE-2>TE-1. These conditions are simultaneously satisfied over the interior of the region formed by the intersection of all four curves and are delineated by a hatched area 61. The output width of the first waveguide 12 can take on any value of between about 0.65 μm and 0.85 μm.

Shown in FIGS. 10a-10d and labeled by the reference numeral 10b is another embodiment of a polarization sorter constructed in accordance with the present invention. The polarization sorter 10b has an input plane 82 and an output plane 84 and an adiabatic region 86 having a length between the input plane 82 and the output plane 84. The polarization sorter 10b has a first waveguide 88 and a second waveguide 90. The first waveguide 88 and the second waveguide 90 are disposed between the input plane 82 and the output plane 84. The first waveguide 88 has an input 92 and an output 94. The second waveguide 90 has an input 96 and an output 98. In general, a light wave is incident upon or enters the polarization sorter 10b via the input 92 of the first waveguide 88 and propagates from the input plane 82 through the adiabatic region 86 of the polarization sorter 10b to the output plane 84, where the light wave exits the polarization sorter 10b. As the light wave propagates through the polarization sorter 10b, the states of polarization are separated.

Figure 10A:
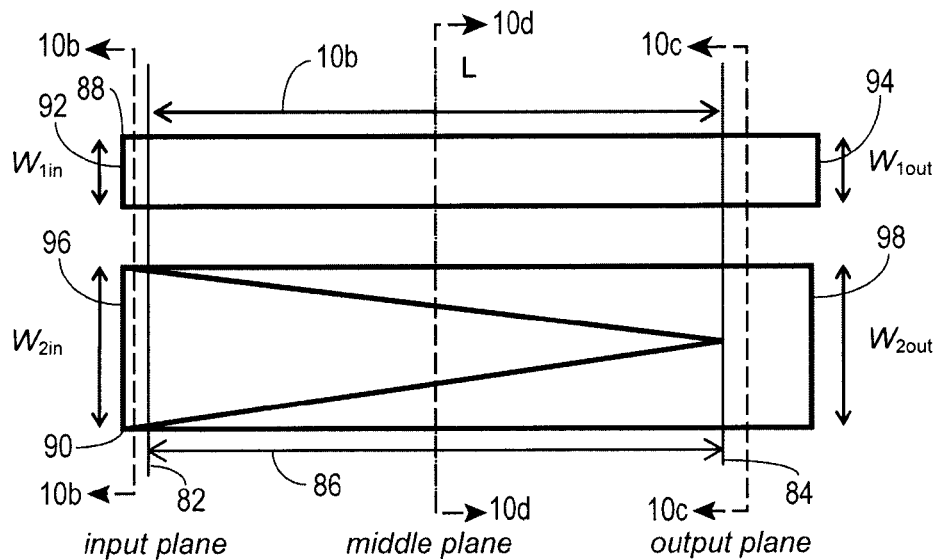
FIGS. 10a-10d depict a second geometry for the polarization sorter.
Figure 10B:
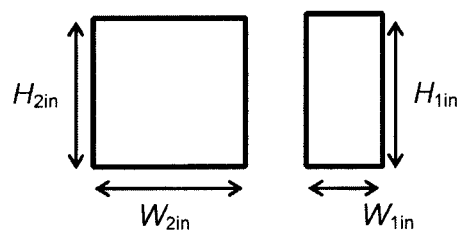
Figure 10C:
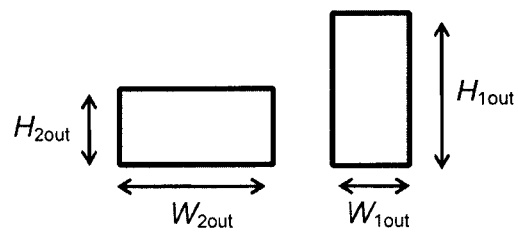
Figure 10D:
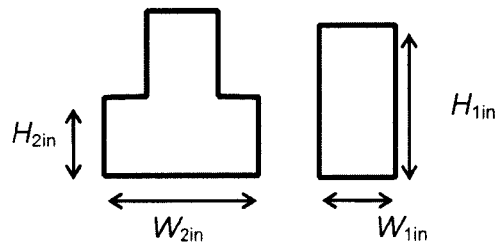

The first waveguide 88 and the second waveguide 90 start at the input plane 82 at the same height as shown in FIG. 10b. However, in the adiabatic region 86 as shown in FIG. 10d along the middle plane, the second waveguide 90 has two different heights where the top section is slowly tapered away. Such a tapered step height can be formed by an etch process which will be described hereinafter. At the output plane 84, the first and second waveguides 88 and 90 have differing heights and widths as shown in FIG. 10c. The waveguide geometries at the input plane 82 and the output plane 84 are chosen appropriately to cause polarization sorting.

While the polarization sorter 10b is generally described herein in terms of the light wave entering via the input 92 and exiting via the outputs 94 and 98 for purposes of clarity of discussion, it should be understood that the present invention also contemplates that alternatively, a light wave can enter the polarization sorter 10*b* via the outputs 94 and 98 and exiting via the input 92. When operated in reverse, the polarization sorter 10*b* is often referred to as a polarization beam combiner, or simply polarization combiner. Further, input 90 may also be used to accept the input light.

Figure 11:
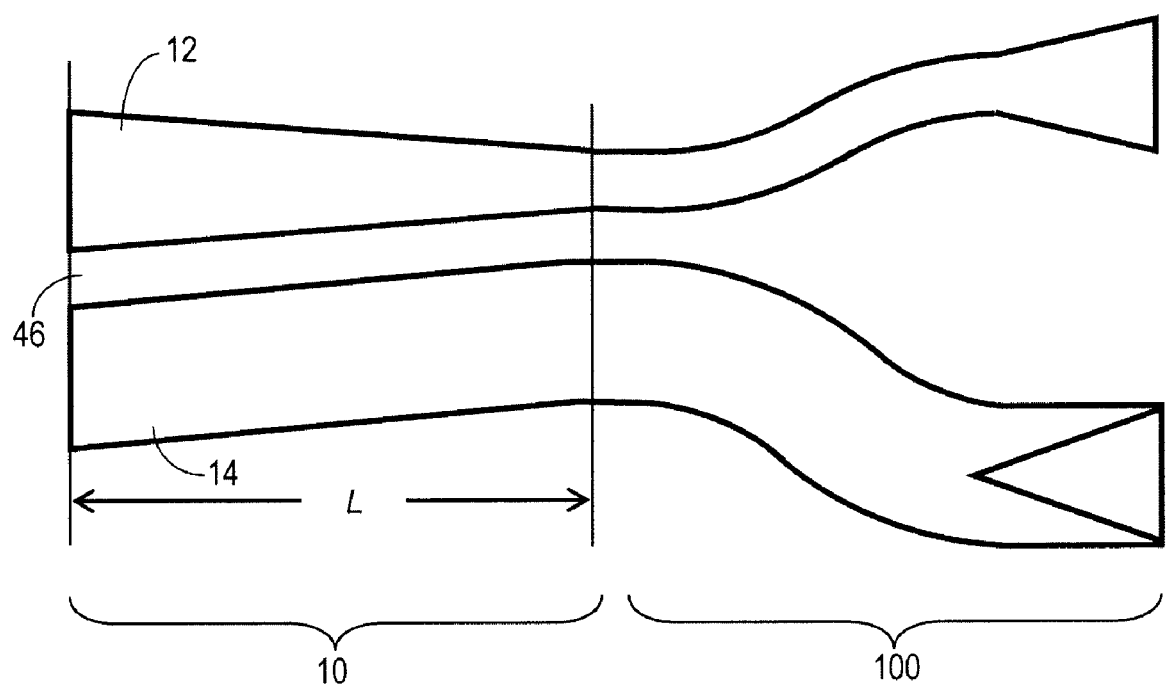
FIG. 11 shows a transition region appended to the output of the polarization sorter of FIG. 1 that is used to restore all waveguides to a common height.

Generally, the polarization sorter 10*b* or 10 is used within a planar lightwave circuit having a multitude of other components, and these other components are typically designed around one particular waveguide height. Referring to FIG. 11, a transition region 100 is appended on the end of the polarization sorter 10 of FIGS. 2*a*-2*c*, which may be referred to herein as a sorting region. The second waveguide 14 is shown being formed in the transition region 100 as a thinner waveguide. The first waveguide 12 is shown as a thicker waveguide in the transition region 100. The second waveguide 14 is restored to the same height as the first waveguide 12. The second waveguide 14 may be produced by etching an originally thicker waveguide as will be detailed subsequently. Alternatively, the first waveguide 12 can be etched down to match the thinner waveguide in the transition region 100. The transition region 100 is designed to have negligible effects on the sorted polarizations.

The first and second waveguides 12 and 14 of the polarization sorter 10 can be fabricated using any technique for forming the first and second waveguides 12 and 14, such as an etching technique. The etching process typically begins with a starting structure that includes a buried waveguide. The buried waveguide has a core material that is at least partially buried or disposed within a cladding material. The core material of the waveguide is typically constructed of a material selected from a group consisting of silicon, silicon nitride, silicon carbide, silicon oxynitride, silicon oxycarbide, silicon oxynitride-carbide, germanium-doped silica, indium phosphide alloys, gallium arsenide alloys, polymers, and combinations thereof. The cladding material is constructed of a material selected from a group consisting of silica, lower index silicon oxynitride, lower index silicon oxycarbide, lower index silicon oxynitride-carbide, lower index doped silica including germanium and or phosphorus doped silica, lower index polymers, and lower index alloys of indium phosphide or gallium arsenide, and combinations thereof.

In a next step of the etching method, a photoresist layer having a desired pattern is disposed on the buried waveguide. The photoresist layer may include one or more openings having a desired shape.

In general, the photoresist layer is constructed of a material that prevents material beneath the photoresist layer from being removed during the etching process. Thus, during etching, the exposed area resulting from the opening in the photoresist layer is removed to a proper depth, and the pattern of the opening is transferred into the core After the etching process is complete, another layer of cladding material is deposited over the entire structure and planarized if needed. A more detailed description of methods for forming the first and second waveguides 12 and 14 having varying heights and widths is described in a co-pending patent application entitled "ADIABATIC POLARIZATION CONVERTER" and identified by U.S. Ser. No. 11/222,358, the content of which is hereby incorporated herein by reference.

It should be noted that the optimum polarization conversion is a result of both the initial etch pattern and also the etch depth. However, since the separating mechanism of the polarization rotator 10 is adiabatic, it is expected that the performance characteristics of the polarization rotator 10 fabricated utilizing the etching method discussed above will have wide latitude in both fabrication and design.

While the above method for fabricating the waveguide structure 10 of the present invention is described above in terms of fabricating one waveguide structure 10, it should be apparent to those skilled in the art that such fabrication methods, as well as any other appropriate fabrication techniques currently known in the art or later developed, can be utilized to fabricate one or more of the waveguide structure 10, or portions thereof, such as when one or more waveguide structures are included on a chip, or on a wafer (e.g., a silicon wafer) having a plurality of chips.

A system of coupled waveguides where all waveguides are the same thickness can be fabricated by a number of well-known methods. See for example, "Integrated Optics, Theory and Technology", by Robert G. Hunsperger, Spring $4^{th}$ Edition 1995, or "Optical Integrated Circuit", by Hiroshi Nishihar, Masamitsu Haruna, Toshiaki Suhara, McGraw-Hill 1989.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. A method of using a passive polarization sorter, the passive polarization sorter including a first waveguide having a first input and a first output constituting a first input and a first output of the passive polarization sorter, respectively, the passive polarization sorter further including a second waveguide having a second input and a second output constituting a second input and a second output of the passive polarization sorter, respectively, a portion of the first waveguide and a portion of the second waveguide defining an adiabatic region, the method comprising the steps of:

introducing an optical signal into one of the first and second inputs of the passive polarization sorter, the optical signal having a first polarized mode and a second polarized mode;

supplying a first portion of the optical signal having one of the first and second polarized modes at the first output of the passive polarization sorter;

evanescently coupling a second portion of the optical signal having a remaining one of the first and second polarized modes into the second waveguide; and supplying the second portion of the optical signal at the second output of the passive polarization sorter.

2. The method of claim 1, wherein the first and second outputs of the polarization sorter are separate.

3. The method of claim 1, wherein a shape of the portion of the first waveguide in the adiabatic region varies along a length of the portion of the first waveguide to cause the evanescent coupling.

4. The method of claim 1, wherein the refractive index of the portion of the first waveguide changes along a length of the portion of the first waveguide to cause the evanescent coupling.

5. The method of claim 1, wherein the first waveguide is separated from the second waveguide.

6. The method of claim 1, wherein the first waveguide has a refractive index substantially the same as a refractive index of the second waveguide.

7. The method of claim 1, wherein the first waveguide has a refractive index different than a refractive index of the second waveguide.

8. The method of claim 1, wherein the portion of the first waveguide has a length and a width, wherein the width of the portion of the first waveguide changes along the length of the portion of the first waveguide.

9. The method of claim 1, wherein the portion of the first waveguide has a length and a height, and wherein the height of the portion of the first waveguide changes along the length of the portion of the first waveguide.

10. The method of claim 1, wherein the portion of the second waveguide has a length and a width, wherein the width of the portion of the second waveguide changes along the length of the portion of the second waveguide.

11. The method of claim 1, wherein the portion of the second waveguide has a length and a height, and wherein the height of the portion of the second waveguide changes along the length of the portion of the second waveguide in the adiabatic region.

12. The method of claim 1, wherein the first waveguide has a core material and the second waveguide has a core material, and wherein the core materials of the first and second waveguides include at least one of: silicon, silicon nitride, silicon carbide, silicon oxynitride, silicon oxycarbide, silicon oxynitride-carbide, germanium-doped silica, indium phosphide alloys, gallium arsenide alloys, and polymers.

13. The method of claim 1, wherein the first polarized mode is a TE polarized mode and the second polarized mode is a TM polarized mode.

14. A method of using a passive polarization combiner, the passive polarization combiner including a first waveguide having a first input and a first output constituting a first input and a first output of the passive polarization sorter, respectively, the passive polarization combiner further including a second waveguide having a second input and a second output constituting a second input and a second output of the passive polarization combiner, respectively, a portion of the first waveguide and a portion of the second waveguide defining an adiabatic region, the method comprising the steps of:
introducing a first light wave into the first input of the first waveguide and a second light wave into the second input of the second waveguide, wherein the first light wave includes a first polarized mode and the second light wave includes a second polarized mode; and
evanescently coupling one of the first light wave and the second light wave from a first one of the portion of the first and second waveguides into a remaining one of the portion of the first and second waveguides to combine the first and second light waves.

15. The method of claim 14, wherein the first and second inputs of the polarization combiner are separate.

16. The method of claim 14, wherein a shape of the portion of the first waveguide varies along the length of the portion of the first waveguide in the adiabatic region.

17. The method of claim 14, wherein the refractive index of the portion of the first waveguide changes along the length of the portion of the first waveguide in the adiabatic region.

18. The method of claim 14, wherein the first waveguide is separated from the second waveguide.

19. The method of claim 14, wherein the first waveguide has a refractive index substantially the same as a refractive index of the second waveguide.

20. The method of claim 14, wherein the first waveguide has a refractive index different than a refractive index of the second waveguide.

21. The method of claim 14, wherein the portion of the first waveguide has a length and a width, wherein the width of the portion of the first waveguide changes along the length of the portion of the first waveguide.

22. The method of claim 14, wherein the portion of the first waveguide has a length and a height, and wherein the height of the portion of the first waveguide changes along the length of the portion of the first waveguide.

23. The method of claim 14, wherein the portion of the second waveguide has a length and a width, wherein the width of the portion of the second waveguide changes along the length of the portion of the second waveguide.

24. The method of claim 14, wherein the portion of the second waveguide has a length and a height, and wherein the height of the portion of the second waveguide changes along the length of the portion of the second waveguide.

25. The method of claim 14, wherein the first waveguide has a core material and second waveguide has a core material, the core materials of the first and second waveguides include at least one of silicon, silicon nitride, silicon carbide, silicon oxynitride, silicon oxycarbide, silicon oxynitride-carbide, germanium-doped silica, indium phosphide alloys, gallium arsenide alloys, polymers, and combinations thereof.

26. The method of claim 14, wherein the first polarized mode is a TE polarized mode and the second polarized mode is a TM polarized mode.

* * * * *